M. SICHMELLER.
RESILIENT WHEEL.
APPLICATION FILED MAR. 1, 1919. RENEWED JULY 29, 1920.

1,372,461.

Patented Mar. 22, 1921.

INVENTOR
Maggie Sichmeller.
BY Frederick Myers
Her ATTORNEY

UNITED STATES PATENT OFFICE.

MAGGIE SICHMELLER, OF WEBSTER, SOUTH DAKOTA.

RESILIENT WHEEL.

1,372,461. Specification of Letters Patent. Patented Mar. 22, 1921.

Application filed March 1, 1919, Serial No. 280,044. Renewed July 29, 1920. Serial No. 399,884.

*To all whom it may concern:*

Be it known that I, MAGGIE SICHMELLER, a citizen of the United States, residing at Webster, in the county of Day and State of South Dakota, have invented certain new and useful Improvements in Resilient Wheels, of which the following is a specification.

This invention relates to improvements in vehicle wheels and has as its special object the provision of resilient elements extended between the tread and an inner rigid rim in such manner that the tread may move limitedly with relation to the hub.

A further object is to provide such resilient devices in forms which may be economically manufactured, readily assembled, and which produce satisfactory results in their use.

These and other like objects are attained by the novel construction and combination of parts hereinafter described, and shown in the accompanying drawings, forming a material part of this disclosure, and in which—

Figure 1:
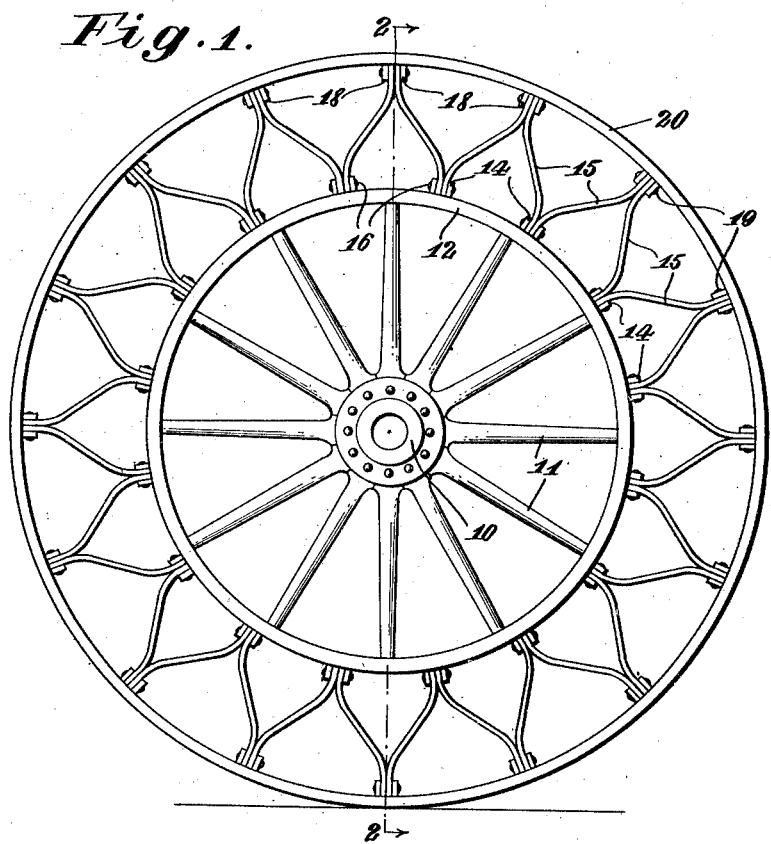
Figure 1 is a side elevational view showing a resilient wheel made in accordance with the invention.
Figure 2:
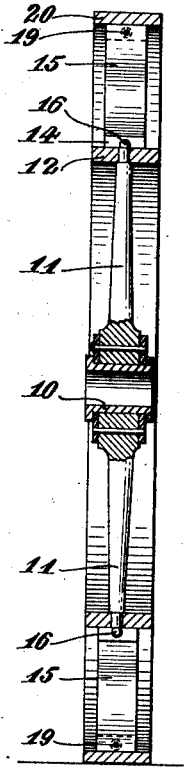
Fig. 2 is a transverse sectional view taken on line 2—2 of Fig. 1.

Referring to the drawings, the wheel is here shown to be comprised of a rigid hub 10 in which are secured the inner ends of a plurality of radiating spokes 11, the outer ends of which are rigidly engaged in an inner annular band or rim 12, having affixed at regularly spaced intervals a plurality of pairs of lugs 14 containing between them an open space receptive of the inner ends of bent flat springs 15, which are perforated, at their center as are also the lugs 14, receptive of securing bolts 16 whereby the springs are held in position.

The outer ends of the springs 15, are received between corresponding lugs 18, arranged in pairs and extending inwardly from the outer rim or tread 20, the lugs and springs being perforated to receive the clamp bolts or securing means 19.

Figure 3:
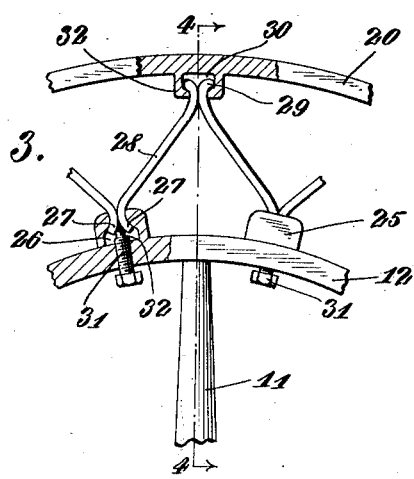
Fig. 3 is a fragmentary side elevational sectional view showing a modification of the spring construction, and, Fig. 4 is a transverse sectional view taken on line 4—4 of Fig. 3.
Figure 4:
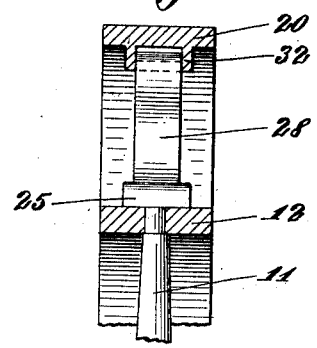

In the modification, shown in Figs. 3 and 4, there is secured upon the periphery of the inner rim 12 a plurality of spaced, outstanding projections 25, having recessed interiors 26 adapted to receive the outwardly bent inner ends 27 of spring elements 28, similar to the springs 15, their outer ends 29 being also bent outwardly and engaged in recesses 30 formed in projections 32 fixed to the tread or outer rim 20.

The hook shaped ends of the springs are easily enterable into the corresponding recesses and are held against disarrangement therein by overhanging edges of the projections 25 and 29, while to secure them firmly therein use is made of a screw 31, having a sharp conical point 32 adapted to engage between the inclined inner edges of the bent elements of the springs, tending to press them slightly apart and firmly into engagement with the interior walls of the recess 26, thus binding the construction firmly together.

In operation, the parts having been assembled as indicated, it will be obvious that the spring elements 15 or 28 act in the manner of spokes, transmitting motion between the inner and outer rims, and at the same time permit of a moderate relative circumferential and radial movement between inner and outer rim, so as to effectually cushion the axle as it passes over obstructions and the like, and the effect being similar to that of the well-known pneumatic tire.

This relative movement of the two rims is allowed by the movements of the ends of the springs 28 within the recesses 26. These ends 27, as shown in Fig. 3 are permitted to execute a limited movement to both sides of the conical points 32 of the screws 31 under the load.

Having thus described my invention what I claim as new and desire to secure by Letters Patent, is—

In a resilient wheel, the combination with an inner rigid rim, spokes engaged therewith, said spokes radiating from a central hub, and an outer rim circumjacently spaced from said inner rim, of a plurality of uniformly disposed projections formed upon the outer surface of said inner rim, a corresponding plurality of inwardly extending projections formed with said outer rim, all of said projections containing undercut recesses, pairwise arranged flat curved spring elements extending between the projections on said inner rim to the projections on said outer rim, bent hook-like elements formed at the ends of said springs engaging within said undercut recesses, and screws entered through said inner rim, said screws having conical points adapted to be engaged with the outturned ends of said springs whereby they are locked in engaged positions.

In testimony whereof, I have signed my name to this specification in the presence of two subscribing witnesses, this 15th day of February, 1919.

MAGGIE SICHMELLER.

Witness:
  I. S. COOMES.